US012314682B2

United States Patent
Freiburghaus

(10) Patent No.: US 12,314,682 B2
(45) Date of Patent: *May 27, 2025

(54) FLOATING POINT ADDER

(71) Applicant: Imagination Technologies Limited, Kings Langley (GB)

(72) Inventor: Max Freiburghaus, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/518,972

(22) Filed: Nov. 25, 2023

(65) Prior Publication Data

US 2024/0103807 A1 Mar. 28, 2024

Related U.S. Application Data

(63) Continuation of application No. 17/989,926, filed on Nov. 18, 2022, now Pat. No. 11,829,728.

(30) Foreign Application Priority Data

Nov. 18, 2021 (GB) ...................................... 2116667

(51) Int. Cl.
*G06F 7/485* (2006.01)
(52) U.S. Cl.
CPC .................... *G06F 7/485* (2013.01)
(58) Field of Classification Search
None
See application file for complete search history.

(56) References Cited

U.S. PATENT DOCUMENTS

| | | | |
|---|---|---|---|
| 5,027,308 A | 6/1991 | Sit et al. | |
| 5,386,375 A | 1/1995 | Smith | |

(Continued)

FOREIGN PATENT DOCUMENTS

| | | |
|---|---|---|
| CN | 109976706 A | 7/2019 |
| CN | 112463113 A | 3/2021 |

(Continued)

OTHER PUBLICATIONS

Machine Translation of Chinese Patent Application CN 109643226 A, 2019. (Year: 2019).*

(Continued)

*Primary Examiner* — Steven G Snyder
(74) *Attorney, Agent, or Firm* — Potomac Law Group, PLLC; Vincent M DeLuca

(57) ABSTRACT

An adder and a method for calculating $2^n+x$ are provided, where x is a variable input expressed in a floating point format and n is an integer. The adder comprises: a first path configured to calculate $2^n+x$ for $x<0$ and $2^{n-1} \leq |x| < 2^{n+1}$; a second path configured to calculate $2^n+x$ for $|x|<2^n$; a third path configured to calculate $2^n+x$ for $|x| \geq 2^n$; and selection logic configured to cause the adder to output a result from one of the first, second, and third paths in dependence on the values of x and n.

20 Claims, 7 Drawing Sheets

(56) References Cited

U.S. PATENT DOCUMENTS

| | | | |
|---|---|---|---|
| 5,506,797 | A | 4/1996 | Koshiba |
| 5,764,556 | A | 6/1998 | Stiles |
| 6,085,208 | A * | 7/2000 | Oberman ............ G06F 9/30038 708/211 |
| 6,085,212 | A * | 7/2000 | Oberman ............ G06F 9/3885 712/E9.02 |
| 6,088,715 | A * | 7/2000 | Oberman ............ G06F 9/30036 712/E9.02 |
| 6,094,668 | A * | 7/2000 | Oberman ............ G06F 9/30021 712/E9.02 |
| 6,131,104 | A * | 10/2000 | Oberman ............ G06F 9/30038 712/E9.02 |
| 6,233,595 | B1 | 5/2001 | Cheng et al. |
| 6,298,367 | B1 * | 10/2001 | Oberman ............ G06F 9/30014 712/E9.02 |
| 6,499,044 | B1 | 12/2002 | Brooks et al. |
| 7,080,111 | B2 | 7/2006 | Pangal et al. |
| 8,037,118 | B2 | 10/2011 | Quinnell et al. |
| 8,214,416 | B2 | 7/2012 | Rigge |
| 8,645,449 | B1 | 2/2014 | Langhammer |
| 9,830,129 | B2 | 11/2017 | Quinnell |
| 10,108,398 | B2 | 10/2018 | Quinnell |
| 10,140,092 | B2 | 11/2018 | Ahmed |
| 11,119,729 | B2 | 9/2021 | Lutz |
| 2003/0115236 | A1 * | 6/2003 | Naini ............ G06F 7/49947 708/505 |
| 2006/0101244 | A1 | 3/2006 | Siu et al. |
| 2010/0023574 | A1 | 1/2010 | Rigge |
| 2011/0040815 | A1 | 2/2011 | Penton et al. |
| 2011/0208794 | A1 | 8/2011 | Ahmed |
| 2012/0239719 | A1 | 9/2012 | Rigge |
| 2013/0007084 | A1 * | 1/2013 | Nystad ............ G06F 7/49942 708/499 |
| 2013/0103732 | A1 | 4/2013 | Asanaka |
| 2015/0142864 | A1 | 5/2015 | Quinnell |
| 2016/0248439 | A1 | 8/2016 | Tanaka |
| 2018/0081630 | A1 | 3/2018 | Quinnell |
| 2018/0129474 | A1 | 5/2018 | Ahmed |
| 2020/0310754 | A1 | 10/2020 | Lutz |

FOREIGN PATENT DOCUMENTS

| | | | |
|---|---|---|---|
| EP | 0474247 A2 * | 3/1992 | ............ G06F 7/485 |
| EP | 3767454 A1 | 1/2021 | |
| EP | 3767455 A1 | 1/2021 | |
| JP | 2007193689 A | 8/2007 | |
| WO | WO-9923548 A2 * | 5/1999 | ............ G06F 17/16 |

OTHER PUBLICATIONS

"Delay-Optimized Implementation of IEEE Floating-Point Addition" by Peter-Michael Seidel and Guy Even, IEEE Transactions on Computers, vol. 53, No. 2, Feb. 2004. (Year: 2004).*
"Verification of Floating-Point Adders" by Yirng-An Chen and Randal E. Bryant, Apr. 1998. (Year: 1998).*
Machine Translation of CN Application 101692202 (2010).
Seidel et al., "On the Design of IEEE Floating Point Adders," IEEE 2001.
Note: *copies of NPL in parent apn*.

* cited by examiner

FLOATING POINT ADDER

CROSS-REFERENCE TO RELATED APPLICATIONS AND CLAIM OF PRIORITY

This application is a continuation under 35 U.S.C. 120 of application Ser. No. 17/989,926 filed Nov. 18, 2022, now U.S. Pat. No. 11,829,728, which claims foreign priority under 35 U.S.C. 119 from United Kingdom Application No. 2116667.3 filed Nov. 18, 2021, the contents of which are incorporated by reference herein in their entirety.

BACKGROUND

The present disclosure relates to a floating point adder, specifically configured for the addition of a variable input in a floating point format to a power of 2.

One way to represent numerical values is in floating point format. Floating point numbers are widely used within the field of computing due to their ability to represent a wide range of values with relatively few bits. A floating point number may be represented using binary bits. A schematic illustration of a binary floating point number is shown in FIG. 1. The floating point number 100 comprises a sign field S 102, exponent field E 104, and mantissa field M 106. The sign field of the floating point number 100 comprises a single sign bit. If a floating point number is an unsigned number, it may not comprise a sign field. The exponent field E comprises a set of ew bits. The mantissa field M comprises a set of mw bits. The significand S of the floating point number comprises the mantissa with an additional leading 1, except for exponent 0 which flags 0 or denormal and $2^{ew}-1$ which flags Infinity or Not a Number ("NaN") codes. This additional leading 1 is implicit and not explicitly included in the data representing the floating point number 100.

Floating point operations have applications in many areas of computer processing, including real-time 3D graphics processing and processing to implement linear algebra, partial differential equations, and Fourier transformations to give just some examples.

Floating point numbers can be added together in software using a general purpose processor. However, it can be more efficient (e.g. in terms of latency and power consumption) to implement a floating point adder in hardware, e.g. in fixed function circuitry, for adding floating point numbers together.

A general purpose floating point adder is a hardware module configured to add two floating point numbers together. A general purpose floating point adder which is configured to add two input floating point numbers together would typically have an alignment unit, an adder unit, a renormaliser unit, an exponent determining unit, a rounding unit and an exception handling unit. The alignment unit calculates the exponent difference between inputs and aligns their significands accordingly. The aligned significands are optionally negated in case of a subtraction and can then be added in 2's complement format in the adder unit by performing binary addition with carry, which may be referred to as "integer addition". The renormaliser unit counts the leading zeros on the mantissa result from the adder unit and shifts the mantissa result so that the leading one is in the correct position for representing the mantissa in a normal floating point format. An indication of the shifting that the renormaliser applies is passed to the exponent determining unit, which uses the indication of the shifting as well as the exponents of the two input numbers to determine the exponent of the floating point result. The rounding unit rounds the mantissa result according to a particular rounding mode (e.g. round away from zero, round towards zero, round towards positive infinity, round towards negative infinity, round to nearest). Finally, the exception unit detects exceptional input codes and exceptional calculated exponents and multiplexes between the calculated floating point result and appropriate exceptions. The result of the addition is a floating point number comprising a sign bit (which is equal to the sign bit of the input number with the largest magnitude or the appropriate exception), exponent bits determined by the exponent determining or exception unit, and mantissa bits representing the rounded mantissa output from the rounding unit or exception. The result is output from the general purpose floating point adder.

The addition of 1.0 to (or subtraction of 1.0 from, or subtraction from 1.0 by) a floating point number can be obtained using a general purpose floating point adder. Some improvements can be achieved by constraining the inputs of the adder, allowing the circuit to be optimised by circuit synthesis tools, provided that the constraint is applied in a way that the tools can understand. However, such improvements can be marginal.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided an adder for calculating $2^n+x$, where x is a variable input expressed in a floating point format and n is an integer, the adder comprising:
 a first path configured to calculate $2^n+x$ for $x<0$ and $2^{n-1} \leq |x| < 2^{n+1}$;
 a second path configured to calculate $2^n+x$ for $|x|<2^n$;
 a third path configured to calculate $2^n+x$ for $|x| \geq 2^n$; and
 selection logic configured to cause the adder to output a result from one of the first, second, and third paths in dependence on the values of x and n.

The selection logic may be configured to select one of the first, second, and third paths by: if $x<0$ and $2^{n-1} \leq |x| < 2^{n+1}$, selecting the first path, thereby causing the adder to output a result from the first path; and if the first path is not selected, selecting the second or third path based on a comparison of $|x|$ and $2^n$.

The selection logic may be configured to select one of the first, second, and third paths by: if the first path is not selected and $|x|<2^n$, selecting the second path, thereby causing the adder to output a result from the second path; and if the first and second paths are not selected, selecting the third path, thereby causing the adder to output a result from the third path.

The selection logic may be configured to select one of the first, second, and third paths by: if the first path is not selected and $|x| \geq 2^n$, selecting the third path, thereby causing the adder to output a result from the third path; and if the first and third paths are not selected, selecting the second path, thereby causing the adder to output a result from the second path.

The selection logic may be configured to perform the comparison of $|x|$ and $2^n$ to determine whether $|x|<2^n$ or $|x| \geq 2^n$ by comparing the exponent of x with n.

The adder may be implemented in fixed-function circuitry. The value of n may be fixed in the fixed-function circuitry.

The adder may further comprise mode switching logic configured to receive an indication of the value of n and to communicate the value of n to the selection logic and to the first, second, and third paths. n may be one of a plurality of pre-set values.

The first path may comprise a negation unit configured to, if $|x|<2^n$, negate the mantissa of x, and output the negated mantissa of x. The negation unit may be configured to, if $|x|\geq 2^n$, output the mantissa x.

The first path might not comprise a shifter configured to shift the bits of x or $2^n$ prior to the operation of the negation unit.

The first path may comprise a renormaliser configured to shift the output of the negation unit to remove leading zeros.

The second and third paths might not comprise a renormaliser.

The second path may comprise a negation unit configured to, if x<0, negate the mantissa of x.

The negation unit of the first path and the negation unit of the second path may be the same unit.

The second path may comprise a right shifter configured to align the mantissa bits of x and $2^n$.

The second and third paths may each comprise a rounding unit configured to round the result of the respective path in accordance with a predefined rounding mode.

The first path might not comprise a rounding unit configured to round the result of the first path. n may be equal to 1, and the selection logic may be configured to determine that $|x|<2^n$ by checking whether the most significant bit of the exponent of x is 0.

The selection logic may comprise one or more multiplexers configured to receive a result from each of the paths, and to output the result from one of the paths in dependence on the values of x and n.

The selection logic may be configured to select one of the paths based on the sign and exponent of x, but not based on the mantissa of x.

The three paths may be configured to commence calculation on receiving one or both of the mantissa and the exponent of x.

The selection logic may be configured to select one of the first, second, and third paths for use for a calculation and the selected path may be used for that calculation, but the unselected paths may not be used for that calculation.

The first and third paths may comprise integer addition logic configured to perform signed binary addition.

The second path might not comprise integer addition logic configured to perform signed binary addition.

The third path may be configured to add or subtract $2^n$ to or from the significand of x in dependence of whether x is positive or negative.

The third path may be configured to, if x<0, subtract $2^n$ from the mantissa of x and change the sign of the result.

The adder may be configured to calculate $x-2^n$ by changing the sign of x, calculating $2^n+x$, and changing the sign of the result of calculating $2^n+x$.

The adder may be configured to calculate $2^n-x$ by changing the sign of x, and calculating $2^n+x$.

There is provided a method of calculating $2^n+x$ using an adder implemented in hardware (e.g. implemented in fixed function circuitry), where x is a variable input expressed in a floating point format and n is an integer, wherein the adder comprises:
  a first path configured to calculate $2^n+x$ for x<0 and $2^{n-1}\leq |x|<2^{n+1}$;
  a second path configured to calculate $2^n+x$ for $|x|<2^n$; and
  a third path configured to calculate $2^n+x$ for $|x|\geq 2^n$;
the method comprising:
  receiving data representing the input, x;
  providing at least some of the data representing x to one or more of the first, second, and third paths for calculating $2^n+x$;
  selecting one of the first, second, and third paths in dependence on the values of x and n; and
  outputting a result calculated by the selected path.

The method may be used to calculate $2^n-x$ by changing the sign of x, and calculating $2^n+x$.

The method may be used to calculate $x-2^n$ by changing the sign of x, calculating $2^n+x$, and changing the sign of the result of calculating $2^n+x$.

There may be provided a method of calculating $2^n-x$ using an adder implemented in hardware (e.g. implemented in fixed function circuitry), where x is a variable input expressed in a floating point format and n is an integer, wherein the adder comprises:
  a first path configured to calculate $2^n+y$ for y<0 and $2^{n-1}\leq |y|<2^{n+1}$, where y is a variable;
  a second path configured to calculate $2^n+y$ for $|y|<2^n$; and
  a third path configured to calculate $2^n+y$ for $|y|\geq 2^n$;
the method comprising:
  receiving data representing the input, x;
  changing the sign of x to determine data representing y, wherein y=−x;
  providing at least some of the data representing y to one or more of the first, second, and third paths for calculating $2^n+y$;
  selecting one of the first, second, and third paths in dependence on the values of y and n; and outputting a result calculated by the selected path.

There may be provided a method of calculating $x-2^n$ using an adder implemented in hardware (e.g. implemented in fixed function circuitry), where x is a variable input expressed in a floating point format and n is an integer, wherein the adder comprises:
  a first path configured to calculate $2^n+y$ for y<0 and $2^{n-1}\leq |y|<2^{n+1}$, where y is a variable;
  a second path configured to calculate $2^n+y$ for $|y|<2^n$; and
  a third path configured to calculate $2^n+y$ for $|y|\geq 2^n$;
the method comprising:
  receiving data representing the input, x;
  changing the sign of x to determine data representing y, wherein y=−x;
  providing at least some of the data representing y to one or more of the first, second, and third paths for calculating $2^n+y$;
  selecting one of the first, second, and third paths in dependence on the values of y and n;
  changing the sign of a result calculated by the selected path to determine an output; and outputting the determined output.

There is also provided an adder for calculating $2^n+x$, where x is a variable input expressed in a floating point format and n is an integer, the adder comprising:
  a small |x| path configured to calculate $2^n+x$ for $|x|<2^n$;
  a large |x| path configured to calculate $2^n+x$ for $|x|\geq 2^n$
  selection logic 208 configured to cause the adder to output a result from one of the small |x| and large |x| paths in dependence on the values of x and n.

A method for calculating $2^n+x$ using an adder implemented in hardware, where x is a variable input expressed in a floating point format and n is an integer, wherein the adder comprises:
  a small |x| path configured to calculate $2^n+x$ for $|x|<2^n$; and a large |x| path configured to calculate $2^n+x$ for $|x|\geq 2^n$; the method comprising:

receiving data representing the input, x;

providing at least some of the data representing x to one or more of the small |x| and large |x| paths for calculating $2^n+x$;

selecting one of the small |x| and large |x| paths in dependence on the values of x and n; and outputting a result calculated by the selected path.

The adder may be embodied in hardware on an integrated circuit. There may be provided a method of manufacturing, at an integrated circuit manufacturing system, an adder. There may be provided an integrated circuit definition dataset that, when processed in an integrated circuit manufacturing system, configures the system to manufacture an adder. There may be provided a non-transitory computer readable storage medium having stored thereon a computer readable description of an adder that, when processed in an integrated circuit manufacturing system, causes the integrated circuit manufacturing system to manufacture an integrated circuit embodying an adder.

There may be provided an integrated circuit manufacturing system comprising: a non-transitory computer readable storage medium having stored thereon a computer readable description of the adder; a layout processing system configured to process the computer readable description so as to generate a circuit layout description of an integrated circuit embodying the adder; and an integrated circuit generation system configured to manufacture the adder according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings.

Figure 1:
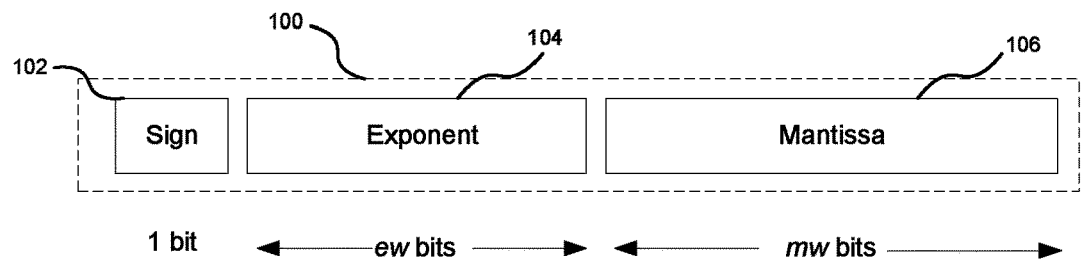
FIG. 1 shows an example of a number in a floating point format.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 2:
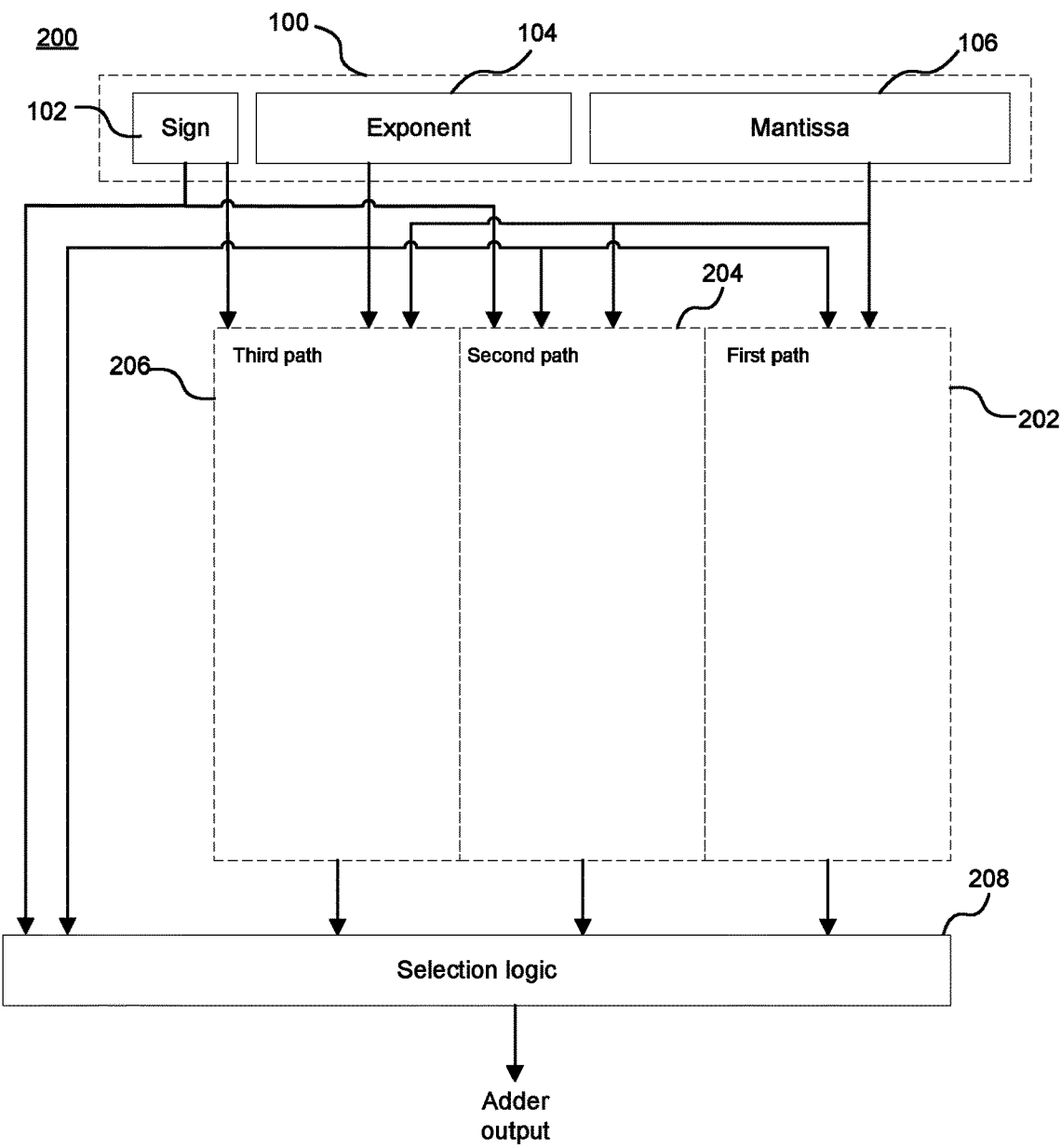
FIG. 2 shows a schematic diagram of a three-path adder capable of calculating $2^n+x$.

FIG. 2 shows a simplified block diagram illustrating certain exemplary features of an adder 200. The adder is optimised for calculating $2^n+x$, where x is a variable input expressed in a floating point format and n is an integer. Just to give some examples, n may be 0, +1 or −1. The possible values of x will be limited by the floating point format. Several examples given herein use half-precision floating point format, but the adder may use any precision format, though the advantages of the adder will be less pronounced at lower precisions. In half-precision format ew=5 and mw=10, with the exponent bias (also known as the exponent offset or zero offset) being 15=$01111_2$. Hence, the exponent can take any value between −14 and 15.

The adder 200 comprises a first, a second, and a third path 202, 204, 206, which may also be referred to as calculation paths. Each of the paths are configured to calculate $2^n+x$ for specific values of x. The inventor has realised that by providing an adder with three paths, each of which can be specifically optimised to calculate $2^n+x$ when the values of n and x have certain values, timing critical components that may be necessary to calculate $2^n+x$ when n and x take on certain values can be omitted in paths that calculate $2^n+x$ when n and x do not take on those certain values.

It should be apparent that the adder may calculate $x-2^n$ by simply calculating $2^n-x$ and changing the sign bit of the result. The adder may calculate $2^n-x$ by changing the sign bit of x and calculating $2^n+x$. As such, the adder is described herein as being for calculating $2^n+x$, but it is to be understood that the adder can be used to calculate any of: (i) $2^n+x$, (ii) $2^n-x$ and (iii) $x-2^n$, where x can be positive or negative.

In particular, the first path 202 is configured to calculate $2^n+x$ for values of x that are close to $2^n$ and negative, the second path 204 is configured to calculate $2^n+x$ for values of |x| that are less than $2^n$ (but, as described below, the output of the second path 204 will not be selected for values of x that are handled on the first path), and the third path 206 is configured to calculate $2^n+x$ for values of J×J that are greater than or equal to $2^n$ (but, as described below, the output of the third path 206 will not be selected for values of x that are handled on the first path). Specifically, we refer to absolute values |x| as close to $2^n$ if and only if $2^{n-1}\leq|x|<2^{n+1}$. This restricts the first path to inputs with just two possible floating point exponents: n−1 and n.

The adder 200 also comprises selection logic 208 configured to cause the adder 200 to output a result from one of the first, second, and third paths in dependence on the values of n and x. As will be discussed in detail later, the selection logic 208 may perform its selection during or after one or more of the paths performs any calculation.

The selection logic 208 may be configured to determine that x<0 by examining the sign bit of x. According to most conventions and formats, if the sign bit is 0, the number is non-negative (i.e. positive or 0) and if the sign bit is 1, the number is negative.

Below, variations and examples of adder 200 will be described that illustrate in more detail how the adder may operate and, in particular, how the calculation paths and selection logic may operate. Various optimisations of the adder 200 are also described.

First Path

Figure 3:
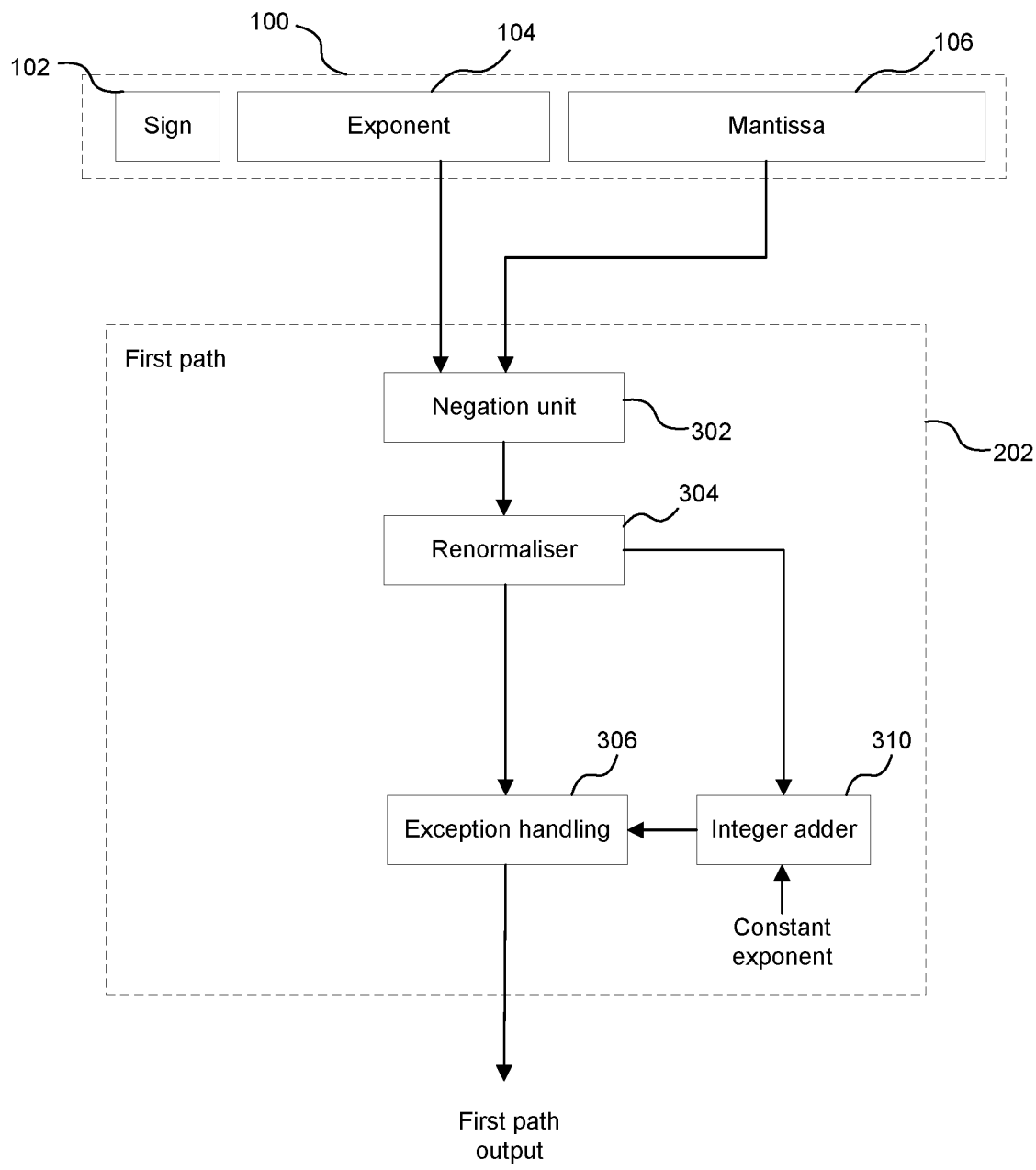
FIG. 3 shows a schematic diagram of the first path of the adder, configured to calculate $2^n+x$, for negative values of x that are close to $2^n$.

The first path 202 is shown in FIG. 3 and may comprise a negation unit 302, a renormaliser 304, an exception handling unit 306 and an integer adder 310. As described above, the first path 202 is configured to calculate $2^n+x$ for values of x which are negative and whose absolute values are close to $2^n$. The negation unit 302 is configured to receive the mantissa of x and negate it if $|x|<2^n$. The negation unit 302 is configured to receive the exponent and mantissa of x. The negation unit 302 may be configured to determine whether $|x|<2^n$ in dependence on the exponent of x. Due to this path's restriction to just 2 possible exponent values, this information can be read from a single exponent bit if n is constant at design time. In this context, negating refers to applying a logical NOT operation and incrementing the result. For example, where the implied 1 of x (with the significand of x, $S=1001001_2$) is aligned 1 position to the right of $2^n$ and subtracted from it

```
  10000000
- 01001001
  ────────
    110111
``` the negated mantissa M of x provides all the significant bits of the integer subtraction result. It is for this reason that no dedicated integer subtraction unit is required in this case of this path.

Where $|x| \geq 2^n$, the mantissa of x is passed as the output of the negation unit 302. This can be referred to as bypassing the negation unit 302. As above, the negation unit 302 may be configured to determine whether $|x| \geq 2^n$ in dependence on one or more bits of the exponent of x. For example, where $S=10010001_2$ is aligned with and subtracted from $2^n$, as shown below:

```
  10000000
- 10010001
  ────────
  -0010001
```

Negative M is the result of the addition. It is for this reason that the negation unit 302 can be bypassed and in this case also, the mantissa of x itself passed as subtraction result without a dedicated integer subtraction unit. Thus, no such integer subtraction unit is required at all on this path.

The first path 202 does not comprise a shifter configured to shift the bits of x or $2^n$ prior to the operation of the negation unit 302.

The renormaliser 304 is configured to remove leading zeroes from the output of the negation unit 302. Renormaliser 304 may be configured to count the leading zeroes and shift the input left by the leading zero count. The shifted bits, excluding the leading one after the removed leading zeroes, are then in a suitable format to represent the mantissa of the result of the addition as they will be fewer than the input mantissa width, i.e. not require any rounding. This is thanks to $|x|$ being close to $2^n$. The first path 202 does not comprise a rounding unit. The renormaliser 304 outputs an indication of the leading zero count to the adder 310, and outputs the shifted mantissa bits to the exception handling unit 306. Methods for performing renormalisation of a floating number (e.g. including leading zero counting and shifting) are known in the art, and as such, the details of those methods are not described in detail herein.

The integer adder 310 is configured to determine the exponent of the output of the first path 202. Inputs $x=-2^n$ and $x=-2^{n-1}$ may have their correct output exponent set by the exception handling on the first path, by exceptional assignment to the leading zero counter before the ensuing integer adder 310, or by the selection logic 208. In particular, in the two situations in which the input $x=-2^n$ or $x=-2^{n-1}$, the mantissa bits are all zeros, and in these cases the renormaliser 304 can automatically produce the correct mantissa for the output (i.e. all zeros) and the output exponent can be set by the exception handling unit 306 to be $n-1$ or 0 respectively. Exponents of the output of the first path 202 for all other inputs may be determined by the integer adder 310, in dependence on the leading zero count determined by the renormaliser 304 and the single bit which previously encoded whether $|x|<2^n$. Integer adder 310 may perform signed integer addition, which may be referred to as signed binary addition. One input to integer adder 310 may be a constant if n is constant at design time, for example $n-1$, the largest possible output exponent on the first path 202, or $n-2$, the largest possible output exponent on this path if $2^{n-1}<|x|<2^n$. The exponent of the output may then be calculated by subtracting the leading zero count from the constant. The dependence on the bit indicating $|x|<2^n$ can be realised by an increment or decrement merged into the integer adder 310 to account for the fact that the largest possible exponent may differ by 1, depending on this bit's value. Alternatively, the integer adder 310 can be configured to subtract the leading zero count from the input exponent to arrive at the output exponent without the increment.

The exception handling unit 306 is configured to receive the shifted mantissa bits which have been output from the renormaliser 304 and to receive an indication of the exponent for the output from the adder 310. Exception handling unit 306 may determine whether an exception flag should be raised in dependence on the output of renormaliser 304. For example, if the output of the renormaliser 304 is 0, the exception handling unit 306 may raise an exception flag.

If the exception handling unit 306 raises an exception flag, then this exception flag can be output from the first path 202 with the result of the calculation so that the selection logic 208 can overwrite the result with the appropriate exception. As another example, the exception handling unit 306 could output the exception itself (rather than outputting the result and an exception flag). If the exception handling unit 306 does not identify an exception, then it outputs, as the output of the first path 202, the shifted mantissa bits received from the renormaliser 304 and exponent bits representing the exponent for the output determined by the integer adder 310, and the sign bit of the result. The sign of the result may be determined by the relative values of $2^n$ and x. For example, where $2^n<|x|$, the output will be negative and where $2^n \geq |x|$, the output will be non-negative.

Rounding Modes and Implementations for Second and Third Path

No rounding is required on the first path. As described below, the second and third paths require intermediate arithmetic values which may be of a higher precision than the desired output format, i.e. they may be non-representable in the final output with precision mw. A rounding unit will be placed as necessary to round the intermediate results to the precision of the desired output format, i.e. round the precise, non-representable intermediate result up or down to a floating point number that is representable in the output format. Bits of the intermediate result that are less significant than the least significant bit of the output format (i.e. the least significant mantissa bit, counting down mw bits from but not including the implied 1 of the significand) are referred to as non-representable. To give some examples, the rounding mode may be rounding to nearest, ties to even (RNE); rounding to nearest, ties away from zero (RNA); rounding toward zero (RTZ); rounding away from zero (RAZ); rounding toward positive infinity (RPI); or rounding toward negative infinity (RNI). A rounding unit will determine whether to round up or down based on any or all of the round bit, guard bit and sticky bit of the intermediate, non-representable result, which we define below. We indicate in which of the above example rounding modes each of these bits is used, and in which of these modes they are not required. This does not limit the use of round, guard and sticky bits to the rounding modes listed above. Which of these bits is used depends upon the rounding mode being used.

- The round bit is the least significant bit of the intermediate, non-representable result that is still representable in the output precision. Only in the RNE mode is the round bit is used for rounding, as a tie breaker by even-ness.
- The guard bit is the most significant non-representable bit of the value to be rounded, i.e. the $(mw+1)^{th}$ most significant bit of the intermediate, non-representable result where the representable width is mw. The guard bit is only used in round-to-nearest modes, e.g. RNE and RNA from among the above.
- The sticky bit is equal to the result of a logical OR operation of the non-representable bits which are less significant than the guard bit. Among the above examples, only RAZ and RNE modes use the sticky bit.

Second Path

Figure 4:
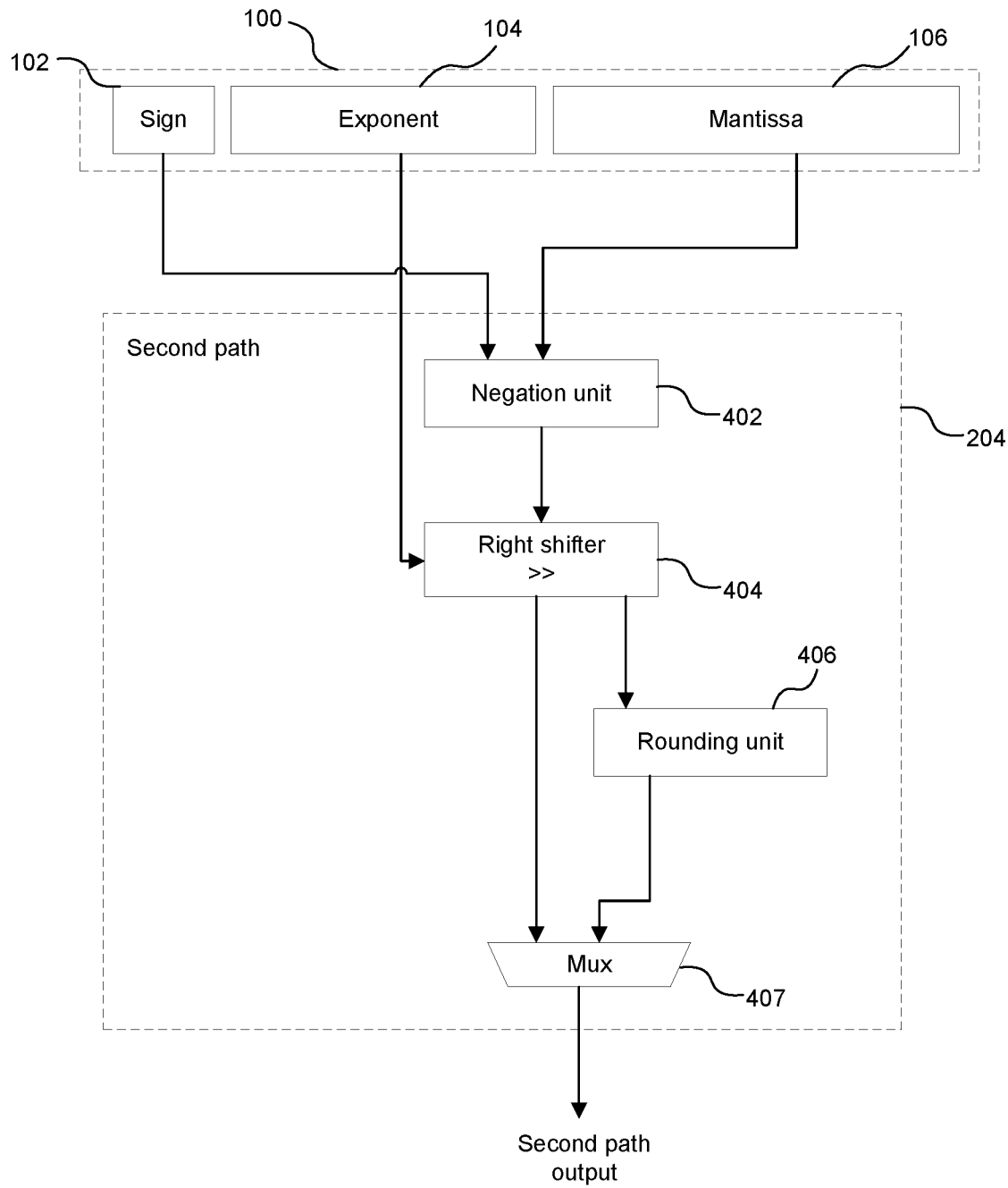
FIG. 4 shows a schematic diagram of the second path of the adder, configured to calculate $2^n+x$, for all values that satisfy $|x|<2^n$ and are not already handled on the first path.

The second path 204 is shown in FIG. 4 and comprises a negation unit 402, a right shifter 404 and a rounding unit 406. As described above, the second path 204 is configured to calculate $2^n+x$ for values of $|x|$ that are less than $2^n$ and not handled on the first path. The negation unit 402 is configured to receive the mantissa of x and negate it if the sign bit is high, indicating x<0. For example, if the sign bit is high, if the significand of x, $S=1101000_2$ and the exponent of x is n−4, then the significand of x is aligned with and subtracted from $2^n$, as shown below:

```
  10000000
-  0001101
  ────────
   1110011
```

One can see that the result is the aligned and negated significand of x. As with the negation unit 302 above, this subtraction is therefore also performed without a dedicated integer subtraction unit. Where x≥0 (as indicated by the sign bit being low), the negation unit 402 passes the mantissa of x as its output.

A single negation unit may be shared by the first and second paths 202, 204. In other words, negation unit 302 and negation unit 402 may be the same unit.

The signed right shifter 404 is configured to receive the output of the negation unit 402 and shift the received value by a variable number of bit positions. In RTZ mode (and related directed modes), input −0 may require setting the sign bit to zero in preparation for the shifter, as the sign bit would otherwise be preserved. In RNE mode, and all other modes that require a sticky bit for rounding, the input to the shifter is padded with (mw+1) trailing zeros to correctly identify the sticky bit after shifting. If rounding is done with a guard bit but no sticky bit, 1 extra bit suffices. The shifting is performed in order to align the received values with $2^n$. In dependence on the sign bit of x, the value received from the negation unit 402 would, after shifting by the difference of n and the exponent of x, either represent the significand of a subtraction or the mantissa of an addition. The number of bit positions that the right-shifter 404 shifts by may therefore be determined by examining all, or a subset of, the exponent bits 104. Instead of always shifting by the difference of the exponent of x with n, we may instead decrement that difference by 1 if x>0, to compensate for the alignment difference of 1 bit between the addition and the subtraction case on this path.

The adder does not require a rounding unit in RTZ rounding mode, where the right shifter 404 can be directly connected to the second path output. Otherwise, the rounding unit 406 is configured to receive the output of the right shifter 404 (which represents the mantissa of the result of the addition, and the guard and sticky bits as necessary) and round the received value according to a predetermined rounding mode. The rounding unit 406 may determine whether a rounding increment is needed and add it to the output from right shifter 404 on this path, or alternatively pass a flag to a shared incrementer for results from path 2 and path 3 to save area. If the increment is added on this path (i.e. the incrementer is not shared between path 2 and path 3), the incrementer is parallelised with the processing of the sticky bit and a multiplexer 407 may select between the raw output and incremented output for mantissa and exponent based on the determination from the rounding unit 406.

Due to the range of x processed on this path, there are no exceptions to handle.

Third Path

Figure 5:
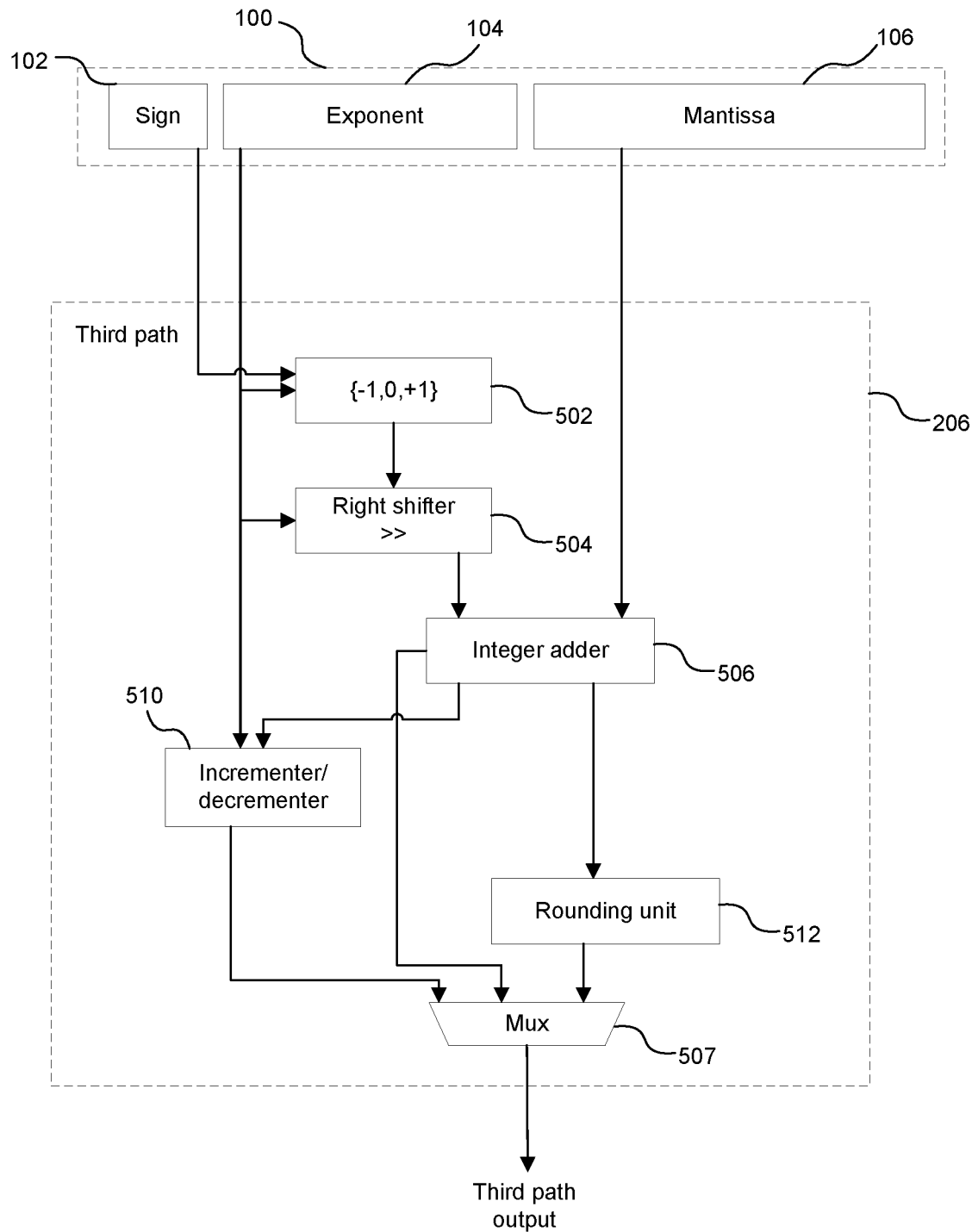
FIG. 5 shows a schematic diagram of the third path of the adder, configured to calculate $2^n+x$, for all values x that satisfy $|x|\geq 2^n$ and are not already handled on the first path.

The third path is shown in FIG. 5 and comprises a determination module 502, labelled {−1, 0, +1}, a right shifter 504, an integer adder 506, an incrementer/decrementer 510 and a rounding unit 512. As described above, the third path 206 is configured to calculate $2^n+x$ for values of $|x|$ that are greater than or equal to $2^n$ and not handled on the first path. Determination module 502 receives the sign bit and exponent of x to determine whether $2^n$ should be added to or subtracted from $|x|$ to calculate $2^n+x|$, representing $2^n$ by +1 or −1, which is subsequently aligned in the correct place by right shifter 504. Determination module 502 further uses the exponent of x (and in directed rounding modes such as RTZ also the sign) to check whether $2^n$ is insignificantly small (and, in a directed rounding mode, insignificantly signed) and to be removed from the addition, which can be achieved by representing $2^n$ by 0. Alternatively, the removal of an insignificant addend can be performed by rounding unit 512. In a directed rounding mode, such as RTZ, $2^n$ is insignificantly small and insignificantly signed when compared to x, when the significant bit of $2^n$ is less significant than the least significant bit of x, that is (e−n)>mw, and when the sign of x is such that addition of $2^n$ acts on x in the opposite direction of rounding. When rounding to nearest, for example in the RNE mode, $2^n$ is insignificantly small when the significant bit of $2^n$ is less significant than the guard bit of x, that is (e−n) >mw+1. For example, in a half-precision format mw=10, so in this example, $2^n$ is insignificantly small compared to x when e>n+11. If mw=10, n<6, the choice of 0 for insignificant $2^n$ also provides automatic handling of input exceptions NaN and INF relevant to this path (due to their maximal exponents), as they will pass through the adder unchanged.

The signed right shifter 504 is configured to receive the output +1, 0 or −1 of the determination unit 502 and shift it in order to align it with x to correctly represent $2^n$. Hence the shift executed by the signed right shifter 504 is dependent on the relative values of $2^n$ and x. In particular, the shift executed by the signed right shifter 504 is dependent on the difference of n and e. In other words, the shift executed by the signed right shifter 504 may be determined in dependence on the exponent of x. More specifically, the shift executed by the signed right shifter 504 may be determined in dependence on a subset of bits of the exponent of x if n was fixed at design time. For example, when using a half precision format and n=0, the shift may be determined from the four least significant bits of the exponent of x.

The integer adder 506 is configured to perform signed addition in 2's complement format of the aligned $2^n$ and the significand represented by the mantissa of x. The following example demonstrates the addition performed by integer adder 506 where x>0 and e=n+4. In this example, $2^n$ (resulting in $00001000_2$) is aligned with and added to the significand of x, where $M=1111000_2$,

```
  011111000
+ 000001000
  ─────────
  100000000
``` in which case the carry requires that the exponent of the result equals the exponent of x incremented by 1.

In another example of the addition performed by integer adder 506 where x>0, e=n+6 and $2^n$ (resulting in $00000010_2$) is aligned with and added to the significand of x, where in this example $M=1111000_2$,

```
  011111000
+ 000000010
  ─────────
  011111010
``` in which case no incrementing of the exponent of x is required.

The following example of x<0 illustrates a subtraction performed by integer adder 506 where e=n+3 and, negative $2^n$ (becoming $111110000_2$) is aligned with and added to the significand of x, in this example $M=0001000_2$,

```
  010001000
```

```
+ 111110000
  ─────────
  001111000
``` in which case the result requires the exponent of x to be decremented by 1.

The incrementer/decrementer 510 is configured to receive two bits of the result of the addition or subtraction performed by integer adder 506 (e.g. the bits of the sum that are aligned with the sign bit and the implied one of the significand), and to increment by 1, decrement by 1 or pass through the exponent of x in dependence on the values of these two bits. As shown in the examples above, only increments and decrements of 1 will be necessary because in the third path we are just concerned with values of |x| that are greater than or equal to $2^n$, and that are not close subtractions already handled on the first path. If the exponent has been decremented before it is received by the incrementer/decrementer 510, the incrementer/decrementer 510 may be accordingly configured to increment the exponent of x by 1 or 2 in dependence on the received values from the integer adder 506. The incremented/decremented exponent may be determined by examining a subset of the bits of the exponent of x.

The adder does not require a rounding unit in RTZ mode, where the integer adder 506 can be directly connected to the multiplexer 507. Otherwise, the rounding unit 512 is configured to receive the result of the addition or subtraction performed by integer adder 506 and to round it according to a predetermined rounding mode. Usefully, the sticky bit can be omitted from the RNE calculation in this rounding mode due to the less significant alignment of the single bit representing $2^n$. Similarly to the rounding unit 406 on the second path 204, rounding unit 512 may determine whether a rounding increment is needed and add it to the output from integer adder 506 on this path, or alternatively pass a flag to a shared incrementer for results from path 2 and path 3 to save area. Multiplexer 507 selects between three possible alignments of the output from integer adder 506, as its leading one may be in 3 different positions depending on the addition or subtraction of $2^n$. This alignment does not depend on the determination of the rounding unit 512, as the rounding increment is never significant enough to change the position of the leading one. If the increment is added on this path (i.e. the incrementer is not shared between path 2 and path 3), a similar multiplexer as on path 2 may select between the incremented and raw output from integer adder 506, and this multiplexer may be merged with multiplexer 507.

The integer adder 310 in the first path 202 may be smaller and faster than the integer adder 506 in the third path 206. There are two reasons for this: (i) the width of the integer adder 310 may be equal to the number of exponent bits (ew) or even ew−1, whereas the width of the integer adder 506 is equal to the number of mantissa bits (mw), which is typically more than the number of exponent bits (ew); and (ii) if n is constant (or very confined), the integer adder 310 adds a constant (or a constant plus a few bits) whereas the integer adder 506 performs signed addition of two variable inputs.

Selection Logic

As described above, adder 200 also comprises selection logic 208 configured to cause the adder 200 to output a result from one of the first, second, and third paths in dependence on the values of n and x.

Specifically, the selection logic 208 may be configured to select one of the first, second, and third paths 202, 204, 206 by selecting the first path 202, thereby causing the adder 200 to output the result from the first path 202, if x<0 and $2^{n-1} \leq |x| < 2^{n+1}$. For example, when using a half precision floating point format with an exponent bias of $15 = 01111_2$ and n=0, the selection logic 208 may be configured to select the first path 202 if the exponent of $x = 01110_2$ or $01111_2$ and x is negative (determined by examining the sign bit of x).

The selection logic 208 may be configured to, if the first path is not selected, select the second or third path based on the comparison of |x| and $2^n$. For example, the selection logic 208 may be configured to select the second path if the first path is not selected and $|x| < 2^n$. The selection logic 208 may be configured to determine whether $|x| < 2^n$ based on the exponent of x or based on a comparison of the exponent of x and n. When using a half precision floating point format with an exponent bias of $15 = 01111_2$ and n=1, the selection logic 208 may be configured to determine whether $|x| < 2^n$ based on the most significant bit of the exponent of x only, without any need to read the less significant bits. If neither the first path 202 nor the second path 204 are selected, the selection logic 208 may be configured to select the third path 206, thereby causing the adder 200 to output a result from the third path 206.

Alternatively, the selection logic 208 may be configured to select the third path 206 if the first path is not selected and $|x| \geq 2^n$. The selection logic 208 may be configured to select the third path 206 if x is NaN. The selection logic 208 may be configured to determine whether $|x| \geq 2^n$ based on the exponent of x or based on a comparison of the exponent of x and n. If neither the first path 202 nor the third path 206 are selected, the selection logic 208 may be configured to select the second path 204, thereby causing the adder 200 to output a result from the second path 204.

In general, the selection logic 208 may assess the values of n and the exponent of x against the criteria required by the calculation paths in any order, not only those given in the previous examples. In particular, any logic that may be shared by two of the three paths may be placed before the split into, or after the join of the paths that share it, but still in parallel with the other path that does not utilise it. For example, the rounding units 406 and 512 from the second and third paths can each be limited to determining whether a rounding increment is required and passing this information to a shared optional incrementer after the join of path 2 and path 3. This saves the area of one rounding incrementer. Joining paths 2 and 3 in this way before finally muxing between path 1 and the others also allows some further slack in the first path to allow an area efficient renormaliser on that path. The term "slack" here can be understood to mean "time", and if a path has more time than it needs then it has some slack. A synthesis tool can fill this slack (i.e. spare time) by using slower and smaller implementations of hardware components (e.g. shifters) without compromising the performance of the adder 200 as a whole.

Another example would be to use a single negation unit in place of negation units 302 and 402 and split the path through that shared unit up into the first and second path after the optional negation result has been computed and is further processed on these respective paths.

As shown in the examples given above, the selection logic 208 may be configured to assess the values of n and x against the criteria for all but one of the calculation paths. The selection logic 208 may be configured to, if the values of n and x do not meet the criteria of the first two paths, select the remaining calculation path.

According to the example shown in FIG. 2, selection logic 208 is configured to receive the sign and exponent bits of x and the outputs of each of the first, second, and third paths 202, 204, 206. The first, second, and third paths 202, 204, 206 may be configured to commence calculation on receiving one or both of the mantissa and the exponent of x. The first, second, and third paths 202, 204, 206 may be configured to commence calculating before the selection logic 208 selects one of the paths. Hence, the most potentially time-consuming parts of the adder 200, the calculation paths, can commence calculating without first having to wait for the selection logic 208 to make any determination or selection based on the values of n and x. In this way, the selection logic 208 can select one of the paths after one or more of the calculation paths have arrived at an answer.

It is noted that a particular calculation path may operate on the input number x even when the input number x is not in the range the particular calculation path is specifically configured for. In this case the particular calculation path might not determine a correct value of $2^n + x$, but that does not cause a problem because in that case the selection logic 208 will not select the particular calculation path for providing the output of the adder, but will select the relevant path with the correct calculation result instead.

The Value of n

The adder 200 may be configured to calculate $2^n + x$ for a fixed value of n. For example, the value of n may be fixed at design time. Hence the adder 200 may be specifically optimised for a particular value of n and be manufactured with that value of n defined in hardware. For example, the value of n may be defined in fixed-function circuitry. This can have the advantage that adder 200 may not require any circuitry to receive n and evaluate its difference with e, as n (or $2^n$) is known or implicit where required in the adder 200. For example, as described above, the selection logic 208 may be configured to determine whether $|x| < 2^n$ based on the exponent of x, or just based on a subset of the bits of the exponent of x. This may be made possible by using a pre-set value of n such that whether $|x| < 2^n$ can be determined without explicitly comparing x and n.

Alternatively, the adder 200 may comprise mode switching logic configured to receive an indication of the value of n and to communicate the value of n to the selection logic 208 and one or more of the first, second, and third paths 202, 204, 206. The value of n may take one of a plurality of pre-set values. The plurality of pre-set values may, for example, be 2, 3, or 4 consecutive integers. Allowing n to take one of a plurality of pre-set values, enables the adder 200 to flexibly perform a plurality of different calculations. However, some of the aforementioned optimisations/shortcuts, such as determining the shift performed by right shifter 504 in dependence on a subset of bits of the exponent of x may only apply when using a value of n=1 or n=0. The bitwidth of n may be less than ew.

Timing Critical Components

In general, the most time-consuming elements of a given path are those that involve variable shifts or carries. Specifically, variable shifts (e.g. prior to addition or in renormalisation) and carries (e.g. in addition, subtraction, and incrementers) will not be known at design time as they will be dependent on the value of x (or on the relative values of x and $2^n$). Whilst the aforementioned components/steps are the most time-consuming, every component or step in a given path introduces additional delay. Hence, by eliminating as many components or steps as possible (particularly those that perform variable shifts and carries) from the critical path, the calculation can be performed in a shorter time.

Adder 200 achieves this by providing the plurality of paths, each of which is configured to calculate $2^n+x$ for a specific range of values of x. By determining for which inputs certain components/steps will or will not be required, those components/steps can then be provided only on the relevant path(s), i.e. not on the paths on which they are not required. This means that the critical path of each path is shorter than the critical path of an adder (e.g. a general purpose adder) with a single path which is configured to calculate $2^n+x$ for the whole range of possible values of x according to the format of x. Since the first, second and third paths described herein operate in parallel, the critical path of the adder 200 which comprises the three paths is shorter than the critical path of an adder with a single path. Therefore, the latency with which the adder 200 can output values of $2^n+x$ is reduced compared to an adder with a single path. Moreover, the area of the logic performed in parallel rather than in sequence will be smaller on the 2 non-critical paths because the units with a large gate-count can be implemented by a synthesis tool to utilise the gained slack in order to realise the most area-efficient implementation.

For example, the first and second paths 202, 204 may each comprise a negation unit 302, 402, which may or may not be a single unit shared by both paths. As shown in the examples given above, the first and second paths 202, 204 are able to make use of a negation unit when x<0 and $|x|<2^n$ as a shortcut in place of full integer subtraction. The third path 206, being configured for $|x| \geq 2^n$, may not comprise a negation unit. The first and second paths 202, 204 do not comprise a shifter which is configured to shift the bits of x or $2^n$ prior to the operation of the negation unit 302, 402.

Similarly, the second and third paths 204, 206 may each comprise a rounding unit 406, 512. These rounding units 406, 512 may be required to round the outputs of the right shifter 404 and the integer adder 506 respectively. The first path 202, being configured for values of x<0 and close to $2^n$ (e.g. $2^{n-1} \leq |x| < 2^{n+1}$) may not comprise a rounding unit. Furthermore, the second path 204 may require rounding using a sticky bit, which is particularly slow, while the third path 206 may not require a sticky bit for its rounding. Hence, different rounding units 406, 512 can be respectively implemented on the second and third paths 204, 206. Specifically, the rounding unit 512 may be configured to perform rounding using a guard and a round bit and no sticky bit. By not providing a general-purpose rounding unit (i.e. a rounding unit using guard, round, and sticky bits) that is shared between the second and third paths 204, 206, the critical path on the third path 206 can be shortened.

Similarly, the first path 202 may comprise renormaliser 304. The maximum shift performed by renormaliser 304 will be mw−1. In contrast, the multiplexer 507 of the third path 206 may only implement a shift of up to 2, which is in general significantly less than mw. The second and third paths 204, 206 may not comprise a renormaliser. Hence, the critical paths of the second and third paths 204, 206 can be shortened by not requiring a renormaliser capable of a shift of mw−1. This will allow more time to save area on the sticky bit reduction and 2's complement addition on those respective paths.

It is noted that rounding units (particularly when implementing a RNE rounding mode) and renormalisers are both relatively slow units compared to other units in the adder. As mentioned above, the first path 202 comprises a renormaliser 304 but not a rounding unit, and the second and third paths 204 and 206 each comprise a rounding unit (406 and 512 respectively) but not a renormaliser. Therefore, none of the three paths include both a renormaliser and a rounding unit. This means that none of the three paths have a sequence of operations including both a renormalisation and a rounding, which means that the latency of all three of the paths is reduced compared to the latency of a general purpose adder which has both a renormaliser and a rounding unit in sequence in the critical path.

Similarly, the third path 206 may comprise an integer adder 506 configured to perform the addition or subtraction of the aligned $2^n$ and the significand or mantissa of x, with carry. Performing an mw+2 or mw+3 integer addition (i.e. on a sign-extended significand with or without a guard bit) will necessarily incur delays. The first and second paths 202, 204 may not comprise an adder configured to perform an mw+2 or mw+3 integer addition. Hence, the critical paths of the first and second paths 202, 204 can be shortened by not requiring a such an adder. This allows savings in both time and area for the renormaliser 304 and rounding unit 406 with sticky bit on the first and second paths respectively.

Similarly, the second and third paths 204, 206 may require addends to be aligned. The second path 204 may align the significand of x with $2^n$ at the negation unit 402, as shown in the example provided above where $M=1010000_2$. The third path 206 may align the addends at the integer adder 506, as shown in the examples provided above. The alignment performed by the second and third paths 204, 206 may be variable and may require shifts of up to mw. The first path 202 may not align any addends.

Method

Figure 6:
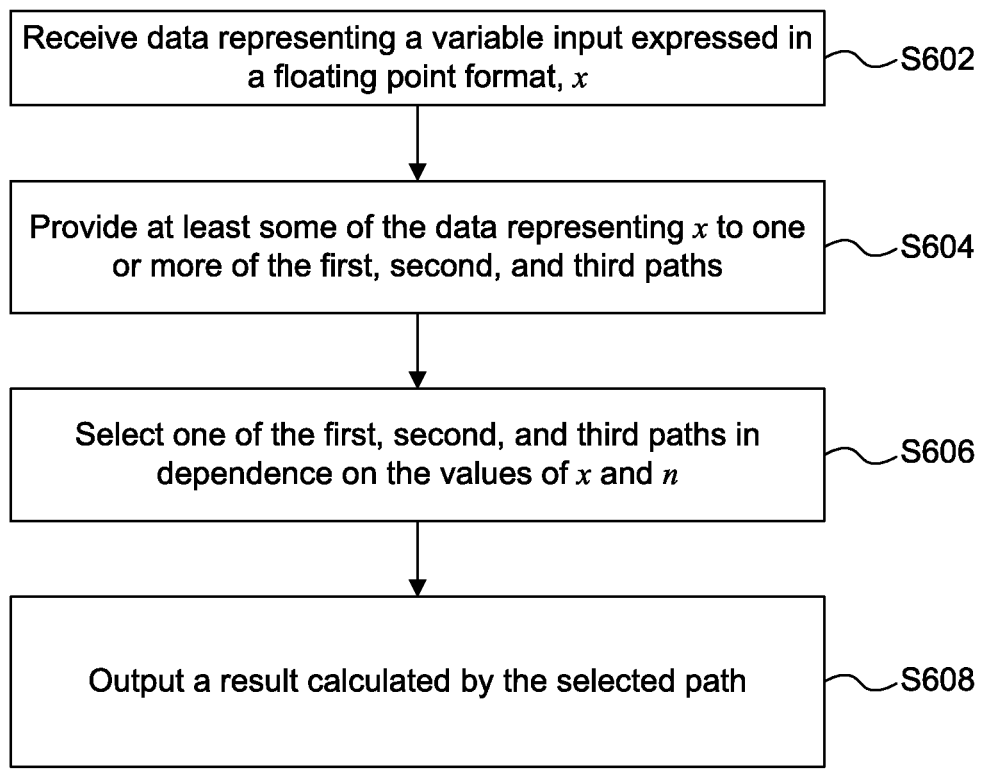
FIG. 6 shows a method of calculating $2^n+x$ using the adder.

FIG. 6 is a flow diagram which describes an exemplary method of calculating $2^n+x$ using the adder 200 described in the examples above. As mentioned above, the adder 200 may be implemented in hardware, e.g. fixed function circuitry. As such, the method shown in FIG. 6 may be implemented in fixed function circuitry (i.e. rather than implementing the method with software instructions executed on a general purpose processor).

At step S602, data representing the variable input in a floating point format, x, is received at the adder 200. At step S604, at least some of the data representing x is provided to one or more of the first, second, and third paths 202, 204, 206.

At step S606, one of the first, second, and third paths 202, 204, 206 is selected in dependence on the values of x and n.

At step S608, a result calculated by the selected path is output. For example, the value of $2^n+x$ calculated by the first path will be output from by the adder 200, if the first path is selected at step S606.

As described above, each of the paths may attempt to calculate $2^n+x$, in which case, at least some of the data representing x is provided to each of the paths at step S604.

The method shown in FIG. 6 illustrates that at least some of the data representing x may be provided to one or more of the paths at step S604, prior to a path being selected at step S606. However, in accordance with examples given for the selection logic 208 above, the selection of the path (e.g. at step 606) may be performed before any of the paths commence calculating and thus step S606 may be performed before step S604. In such a case, which path(s) x is provided to in step S604 may depend on the selection made in step S606. If the adder 200 contains registers between its inputs and outputs, the selection logic 208 may be placed before these registers to power gate those among them that are exclusively serving one or two of the paths (and their subsequent combinational logic) whenever that path is, or these paths are, unused. For example, if the selection logic 208 is resolved before some or all of the registers and combinational logic units on two of the paths, it can be used to prevent the registers on these two paths from updating whenever the selection logic indicates that the other path is required for the input received by adder 200. This will save power within the gated register cells, as well as in the combinational logic driven by them.

As described in the examples above for the mode selection logic, the method may also comprise receiving a value of n at the adder 200. The value of n may then be communicated to the calculation paths.

Figure 7:
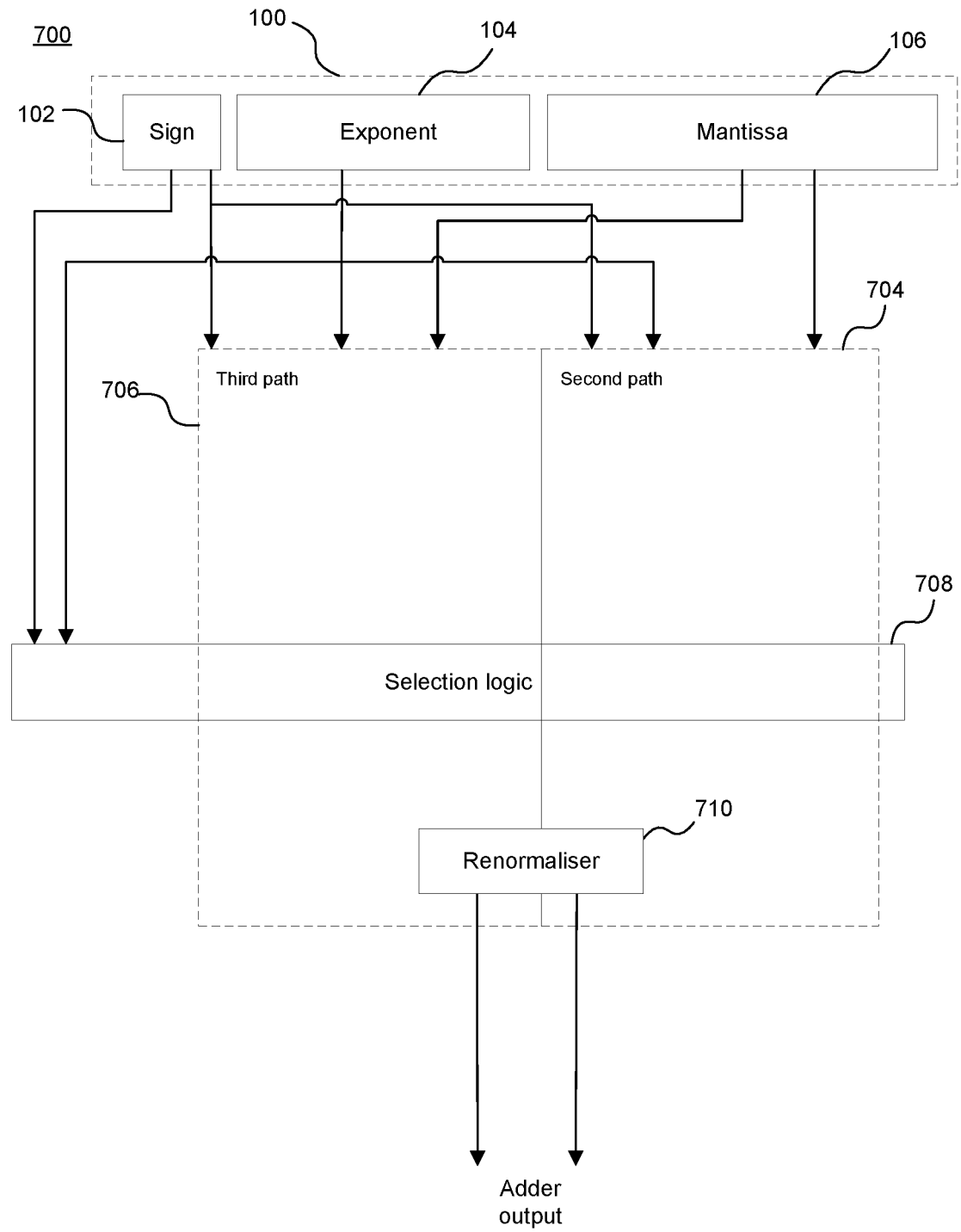
FIG. 7 shows a schematic diagram of a two-path adder capable of calculating $2^n+x$.

Adder 200 may alternatively comprise two calculation paths, specifically, the second and third paths 204, 206. In this case, the adder may not comprise three calculation paths (e.g. the first path 202 may be omitted). An example of an adder 700 comprising only two calculation paths is shown in FIG. 7. The adder 700 comprises calculation paths 704, 706, which substantially correspond to the second and third paths 204, 206 as described above. The adder 700 may further comprise a renormaliser 710 configured to remove leading zeros from the outputs of the second and third paths 204, 206. Such an adder 700 with two calculation paths would be particularly advantageous when it is known that x will always be positive, for example, if the adder is configured to calculate $2^n+|x|$. In such a case, a first path 202 would go unused as no subtraction occurs and thus no additional renormaliser would be required. Furthermore, any exponent logic can be shared between the paths and can be applied after selection logic 208 selects the appropriate path to use. For example, the multiplexer 507 may apply the rounding increment subsequent to the selection logic 708 selecting a path.

Figure 8:
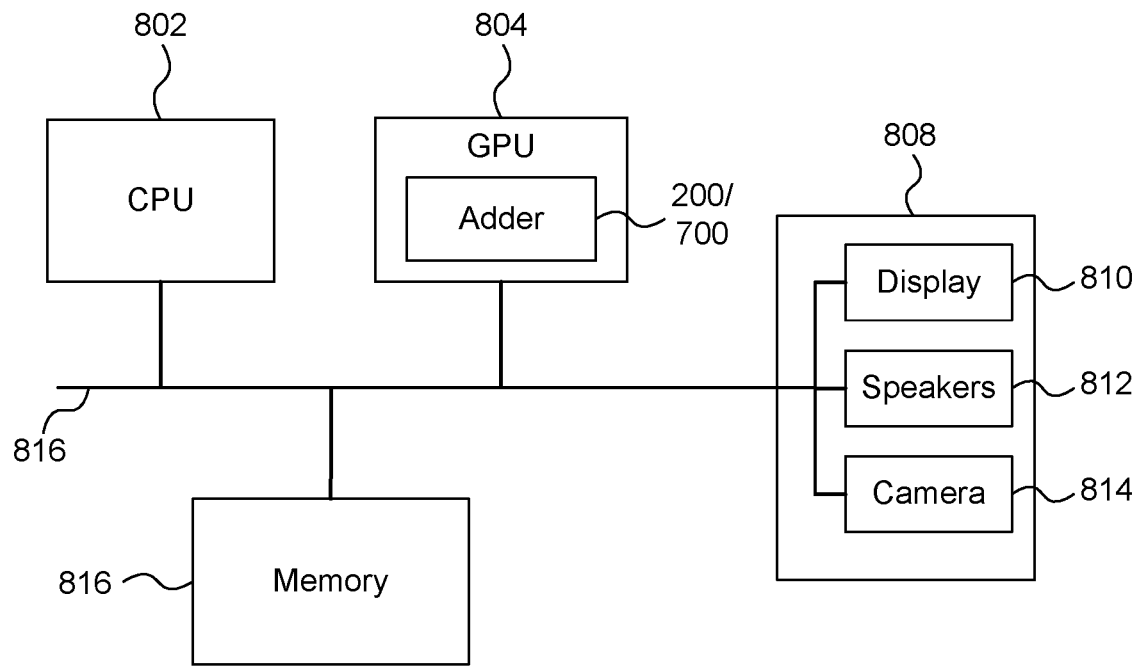
FIG. 8 shows a computer system in which an adder is implemented.

FIG. 8 shows a computer system in which an adder as described herein may be implemented. The computer system comprises a CPU 802, a GPU 804, a memory 806 and other devices 808, such as a display 810, speakers 812 and a camera 814. In this example, adder 200 or adder 700 is implemented on the GPU 804. In other examples, adder 200 or adder 700 could be implemented on the CPU 802, or on some other processing unit (not shown in FIG. 8). The components of the computer system can communicate with each other via a communications bus 816.

The adder 200 of FIGS. 2 to 5 and the adder 700 of FIG. 7 are shown as comprising a number of functional blocks. This is schematic only and is not intended to define a strict division between different logic elements of such entities. Each functional block may be provided in any suitable manner. It is to be understood that intermediate values described herein as being formed by an adder need not be physically generated by the adder at any point and may merely represent logical values which conveniently describe the processing performed by the adder between its input and output.

The adders described herein may be embodied in hardware on an integrated circuit. The adders described herein may be configured to perform any of the methods described herein. Generally, any of the functions, methods, techniques or components described above can be implemented in software, firmware, hardware (e.g., fixed logic or fixed function circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture adder 200 or adder 700 configured to perform any of the methods described herein, or to manufacture adder 200 or adder 700 comprising any apparatus described herein. An integrated circuit definition dataset may be, for example, an integrated circuit description.

There may be provided a method of manufacturing, at an integrated circuit manufacturing system, adder 200 or adder 700 as described herein. There may be provided an integrated circuit definition dataset that, when processed in an integrated circuit manufacturing system, causes the method of manufacturing an adder to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture adder 200 or adder 700 as described above will now be described with respect to FIG. 9.

Figure 9:
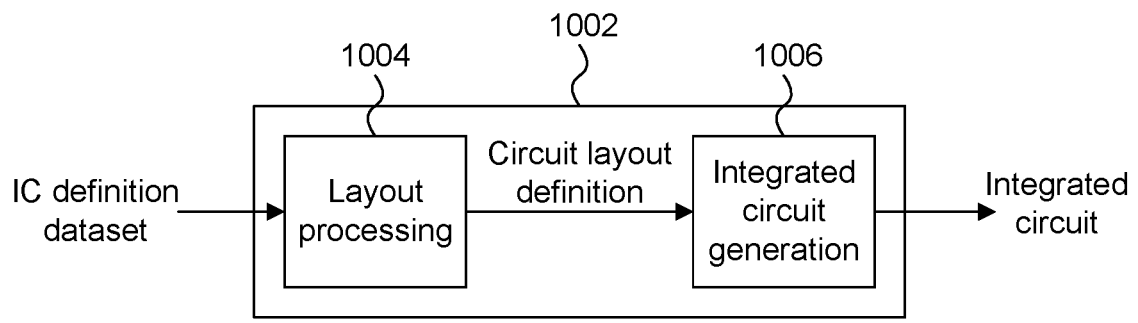
FIG. 9 is a schematic diagram of an integrated circuit manufacturing system.

FIG. 9 shows an example of an integrated circuit (IC) manufacturing system 1002 which is configured to manufacture adder 200 or adder 700 as described in the examples herein. In particular, the IC manufacturing system 1002 comprises a layout processing system 1004 and an integrated circuit generation system 1006. The IC manufacturing system 1002 is configured to receive an IC definition dataset (e.g. defining adder 200 or adder 700 as described in any of the examples herein), process the IC definition dataset, and generate an IC according to the IC definition dataset (e.g. which embodies an adder 200 as described in any of the examples herein). The processing of the IC definition dataset configures the IC manufacturing system 1002 to manufacture an integrated circuit embodying an adder 200 as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an adder 200 or adder 700 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An adder for calculating $2^n+x$, where x is a variable input expressed in a floating point format and n is an integer, the adder comprising:
   a small |x| path configured to calculate $2^n+x$ for $|x|<2^n$;
   a large |x| path configured to calculate $2^n+x$ for $|x|\geq 2^n$; and
   selection logic configured to cause the adder to output a result from one of the small |x| and large |x| paths in dependence on the values of x and n.

2. The adder according to claim 1, wherein the selection logic is configured to select one of the small |x| and large |x| paths by:
   if $|x|<2^n$, selecting the small |x| path, thereby causing the adder to output a result from the small |x| path; and
   if the small |x| path is not selected, selecting the large |x| path, thereby causing the adder to output a result from the large |x| path.

3. The adder according to claim 1, wherein the selection logic is configured to select one of the small |x| and large |x| paths by:
   if $|x|\geq 2^n$, selecting the large |x| path, thereby causing the adder to output a result from the large |x| path; and
   if the large |x| path is not selected, selecting the small |x| path, thereby causing the adder to output a result from the small |x| path.

4. The adder according to claim 1, wherein the selection logic is configured to perform a comparison of |x| and $2^n$ to determine whether $|x|<2^n$ or $|x|\geq 2^n$ by comparing an exponent of x with n.

5. The adder according to claim 1, wherein the adder is implemented in fixed-function circuitry, wherein the value of n is fixed in the fixed-function circuitry.

6. The adder according to claim 1, further comprising mode switching logic configured to receive an indication of the value of n and to communicate the value of n to the selection logic and to the small |x| and large |x| paths.

7. The adder according to claim 1, wherein the small |x| and large |x| paths do not comprise a renormaliser.

8. The adder according to claim 1, wherein the small |x| path comprises a negation unit configured to, if x<0, negate an mantissa of x.

9. The adder according to claim 1, wherein the small |x| path comprises a right shifter configured to align mantissa bits of x and $2^n$.

10. The adder according to claim 1, wherein the small |x| and large |x| paths each comprise a rounding unit configured to round the result of the respective path in accordance with a predefined rounding mode.

11. The adder according to claim 1, wherein the selection logic comprises one or more multiplexers configured to receive a result from each of the paths, and to output the result from one of the paths in dependence on the values of x and n.

12. The adder according to claim 1, wherein the paths are configured to commence calculation on receiving one or both of a mantissa and an exponent of x.

13. The adder according to claim 1, wherein the selection logic is configured to select one of the small |x| and large |x| paths for use for a calculation and the selected path is used for that calculation, but the unselected path is not used for that calculation.

14. The adder according to claim 1, wherein the large |x| path comprises integer addition logic configured to perform signed binary addition, and wherein the small |x| path does not comprise integer addition logic configured to perform signed binary addition.

15. The adder according to claim 1, wherein the large |x| path is configured to add or subtract $2^n$ to or from a significand of x in dependence of whether x is positive or negative.

16. The adder according to claim 1, wherein the large |x| path is configured to, if x<0, subtract $2^n$ from a mantissa of x and change a sign of the result.

17. The adder according to claim 1, wherein the adder is configured to calculate $x-2^n$ by changing a sign of x, calculating $2^n+x$, and changing a sign of the result of calculating $2^n+x$.

18. The adder according to claim 1, wherein the adder is configured to calculate $2^n-x$ by changing a sign of x, and calculating $2^n+x$.

19. A non-transitory computer readable storage medium having stored thereon an integrated circuit definition dataset that, when processed in an integrated circuit manufacturing system, configures the integrated circuit manufacturing system to manufacture an adder for calculating $2^n+x$, where x is a variable input expressed in a floating point format and n is an integer, the adder comprising:
   a small |x| path configured to calculate $2^n+x$ for $|x|<2^n$;
   a large |x| path configured to calculate $2^n+x$ for $|x|\geq 2^n$; and
   selection logic configured to cause the adder to output a result from one of the small |x| and large |x| paths in dependence on values of x and n.

20. A method of calculating $2^n+x$ using an adder implemented in hardware, where x is a variable input expressed in a floating point format and n is an integer, wherein the adder comprises:
   a small |x| path configured to calculate $2^n+x$ for $|x|<2^n$; and
   a large |x| path configured to calculate $2^n+x$ for $|x|\geq 2^n$;
   the method comprising:
   receiving data representing the input, x;
   providing at least some of the data representing x to one or more of the small |x| and large |x| paths for calculating $2^n+x$;
   selecting one of the small |x| and large |x| paths in dependence on values of x and n; and
   outputting a result calculated by the selected path.

* * * * *

UNITED STATES PATENT AND TRADEMARK OFFICE
CERTIFICATE OF CORRECTION

PATENT NO. : 12,314,682 B2
APPLICATION NO. : 18/518972
DATED : May 27, 2025
INVENTOR(S) : Max Freiburghaus Page 1 of 1

It is certified that error appears in the above-identified patent and that said Letters Patent is hereby corrected as shown below:

In the Specification

Column 6, Line 57:
J×J

Should read:
-- $|x|$ --

Signed and Sealed this
Fifteenth Day of July, 2025

Coke Morgan Stewart
*Acting Director of the United States Patent and Trademark Office*